United States Patent
Jiang et al.

(10) Patent No.: US 9,866,840 B2
(45) Date of Patent: Jan. 9, 2018

(54) METHOD AND APPARATUS FOR VERTEX ERROR CORRECTION

(71) Applicant: THOMSON LICENSING, Issy de Moulineaux (FR)

(72) Inventors: Wenfei Jiang, Beijing (CN); Kangying Cai, Beijing (CN); Jiang Tian, Beijing (CN)

(73) Assignee: THOMSON Licensing, Issy-les-Moulineaux (FR)

(*) Notice: Subject to any disclaimer, the term of this patent is extended or adjusted under 35 U.S.C. 154(b) by 191 days.

(21) Appl. No.: 14/655,358

(22) PCT Filed: Jun. 18, 2013

(86) PCT No.: PCT/CN2013/077404
§ 371 (c)(1),
(2) Date: Jun. 25, 2015

(87) PCT Pub. No.: WO2014/107944
PCT Pub. Date: Jul. 17, 2014

(65) Prior Publication Data
US 2015/0373329 A1    Dec. 24, 2015

(30) Foreign Application Priority Data

Jan. 10, 2013  (WO) ................ PCT/CN2013/070310

(51) Int. Cl.
*H04N 19/94*     (2014.01)
*H04N 19/90*     (2014.01)
(Continued)

(52) U.S. Cl.
CPC .......... *H04N 19/126* (2014.11); *G06T 9/001* (2013.01); *H04N 19/154* (2014.11); *H04N 19/46* (2014.11);
(Continued)

(58) Field of Classification Search
None
See application file for complete search history.

(56) References Cited

U.S. PATENT DOCUMENTS 5,768,438 A * 6/1998 Etoh ...................... H04N 19/61
                                                          375/E7.081
5,905,502 A * 5/1999 Deering ................. G06T 9/001
                                                          345/418
(Continued)

FOREIGN PATENT DOCUMENTS

CN     101511017      8/2009
CN     101666625      3/2010
(Continued)

OTHER PUBLICATIONS

Touma, et al., "Triangle Mesh Compression", Proceedings of Graphics Interface '98: Vancouver, British Columbia, Canada, Jun. 18-20, 1998, pp. 26-34.*

(Continued)

*Primary Examiner* — Reza Aghevli
(74) *Attorney, Agent, or Firm* — Brian J. Dorini; Xiaoan Lu (57) ABSTRACT

A 3D model can be modeled using "pattern-instance" representation, wherein an instance component may be represented as transformation (for example, rotation, translation, and scaling) of a pattern. Quantization errors may be introduced when encoding rotation information, causing different vertex coordinate errors at different 5 vertices of an instance. To efficiently compensate the vertex coordinate errors, the encoder decides a quantization parameter for compensating a vertex coordinate error. The quantization parameter is signaled in the bitstream as a quantization index. The quantization index, a quantization table the indicates a mapping between quantization indices and quantization parameters, and vertex coordinate errors are 10 encoded into (Continued)

a bitstream. The quantization table may be built based on statistical data. At the decoder, the vertex coordinate error is decoded based on a quantization parameter, which is determined from a received quantization index.

20 Claims, 4 Drawing Sheets (51) Int. Cl.
*H04N 19/597* (2014.01)
*H04N 19/46* (2014.01)
*H04N 19/126* (2014.01)
*G06T 9/00* (2006.01)
*H04N 19/154* (2014.01)

(52) U.S. Cl.
CPC ........... *H04N 19/597* (2014.11); *H04N 19/90* (2014.11); *H04N 19/94* (2014.11)

(56) References Cited

U.S. PATENT DOCUMENTS

| | | | |
|---|---|---|---|
| 6,075,901 | A | 6/2000 | Signes et al. |
| 6,204,854 | B1 | 3/2001 | Chee |
| 6,891,535 | B2 | 5/2005 | Perry et al. |
| 6,947,045 | B1 * | 9/2005 | Ostermann ............ H04N 19/70 345/473 |
| 7,289,868 | B2 | 10/2007 | Picciotto et al. |
| 8,310,480 | B2 | 11/2012 | Kim et al. |
| 2002/0090135 | A1 * | 7/2002 | Yamaguchi ............... G06T 3/40 382/232 |
| 2007/0076967 | A1 * | 4/2007 | Kim ..................... H04N 19/107 382/239 |
| 2008/0031325 | A1 * | 2/2008 | Qi ....................... H04N 19/176 375/240.09 |
| 2009/0184956 | A1 * | 7/2009 | Kim .......................... G06T 9/20 345/420 |
| 2009/0196361 | A1 * | 8/2009 | Chan ..................... H04L 1/0045 375/260 |
| 2011/0285708 | A1 * | 11/2011 | Chen ....................... G06T 9/004 345/420 |
| 2012/0075302 | A1 | 3/2012 | Cai et al. |
| 2012/0106858 | A1 | 5/2012 | Cai et al. |
| 2013/0039412 | A1 * | 2/2013 | Narroschke .......... H04N 19/197 375/240.03 |
| 2013/0106834 | A1 * | 5/2013 | Curington ................. G06T 9/00 345/419 |
| 2015/0005582 | A1 | 1/2015 | Poll et al. |
| 2015/0084954 | A1 | 7/2015 | Cai et al. |

FOREIGN PATENT DOCUMENTS

| | | |
|---|---|---|
| CN | 102308318 | 1/2012 |
| CN | 102509339 | 6/2012 |
| JP | 2000011206 | 1/2000 |
| JP | 2001231037 | 8/2001 |
| JP | 2002532923 | 10/2002 |
| JP | 2004102834 | 4/2004 |
| JP | 2005332412 | 12/2005 |
| JP | 2006277772 | 10/2006 |
| JP | 2006235858 | 9/2007 |
| JP | 2012530990 | 12/2012 |
| JP | 2015520885 | 7/2015 |
| JP | 2015520886 | 7/2015 |
| KR | 2001008944 | 2/2001 |
| WO | WO9858350 | 12/1998 |
| WO | WO0103071 | 1/2001 |
| WO | WO2010149492 | 12/2010 |
| WO | WO2011044713 | 4/2011 |
| WO | WO2012000132 | 1/2012 |
| WO | WO2012040883 | 4/2012 |
| WO | WO2013113170 | 8/2013 |

OTHER PUBLICATIONS

Chen, et al., "The Video Mesh: A Data Structure for Image-based Three-dimensional Video Editing", Computer Science and Artificial Intelligence Laboratory Technical Report, Dec. 16, 2009, 9 pages.
Sorkine O et al: "High-pass quantozation for mesh encoding", Symposium on Geometry Processing, Jun. 23, 2003, pp. 42-51.
Anonymous: "WD for Pattern based 3D mesh compression",102 MPEG Meeting; Oct. 15, 2012-Oct. 19, 2012; Shanghai; (Motion Picture Expert Group or ISO/IEC JTC1/SC29/WG11), n° N13178,Oct. 22, 2012.
Cai Kangying et al: "PB3DMC error compensation",102 MPEG Meeting; Oct. 15, 2012-Oct. 19, 2012; Shanghai; (Motion Picture Expert Group or ISA-IEC JTC1/SC29/WG11),n° m26702, Oct. 9, 2012.
Lei Zhang et al: "Cascaded quantization based progressive 3D mesh compression",3DTV Conference: The Truth Vision—Capture, Transmission ANS Display of 3D Video (3DTV-CON), 2011, IEEE,May 16, 2011, pp. 1-4.
Seungwook Lee et al: "A Proposal on quantization of 3D mesh coding",85 MPEG Meeting; Jul. 21, 2008-Jul. 25, 2008; Hannover; 5Motion Picture Expert Group or ISO/IEC JTC1/SC29/WG11),n° M15669,Jul. 17, 2008.
Mary-Luc Champel: "PB3DMC bitstream update (error compensation)",103 MPEG Meeting; Jan. 21, 2013-Jan. 25, 2013; Geneva; (Motion Picture Expert Group or ISO/IEC JTC1/SC29/WG11),n° m28147,Jan. 21, 2013.

* cited by examiner

METHOD AND APPARATUS FOR VERTEX ERROR CORRECTION

This application is a National Stage Application and claims the benefit, under 35 U.S.C. §365 of International Application PCT/US2013/077404 filed Jun. 18, 2013 which was published in accordance with PCT Article 21(2) on Jul. 17, 2014 in English. This application also claims priority to the Chinese Patent Application PCT/CN2013/070310 which was filed 10 Jan. 2013.

TECHNICAL FIELD

This invention relates to a method and apparatus for generating a bitstream representative of a 3D model, and a method and apparatus for decoding the same.

BACKGROUND

Figure 1:
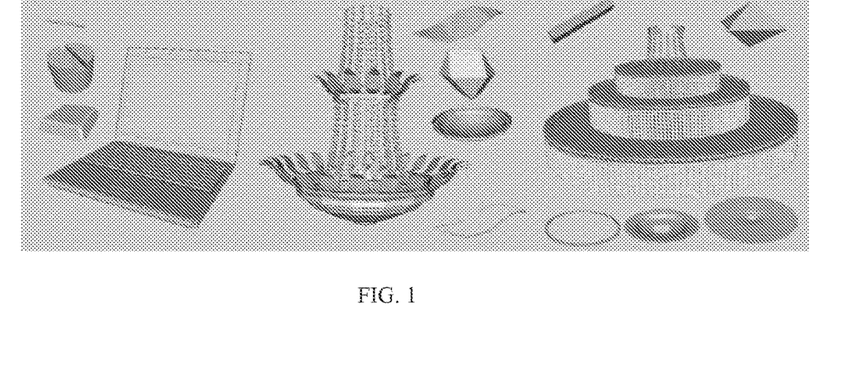
FIG. 1 shows exemplary 3D models with a large number of connected components and repetitive structures.

In practical applications, many 3D models consist of a large number of connected components. These multi-component 3D models usually contain many repetitive structures in various transformations, as shown in FIG. 1.

Compression algorithms for multi-component 3D models that take advantage of repetitive structures in the input models are known. Repetitive structures of a 3D model are discovered in various positions, orientations, and scaling factors. The 3D model is then organized into "pattern-instance" representation. A pattern is used to denote a representative geometry of the corresponding repetitive structure. Components belonging to a repetitive structure are denoted as instances of the corresponding pattern and may be represented by a pattern ID and transformation information, for example, reflection, translation, rotation and possible scaling with respect to the pattern. The instance transformation information may be organized into, for example, reflection part, translation part, rotation part, and possible scaling part. There might be some components of the 3D models that are not repetitive, which are referred to as unique components.

A commonly owned PCT application, entitled "Vertex Correction for Rotated 3D Components" by W. Jiang, K. Cai, and J. Tian (PCT/CN2012/074286, hereinafter "Jiang"), the teachings of which are specifically incorporated herein by reference, discloses a method and apparatus for vertex error compensation when encoding and decoding a 3D model.

SUMMARY

The present principles provide a method for generating a bitstream representing a 3D model, comprising the steps of: accessing a reconstructed instance corresponding to an instance; determining a quantization parameter based on a vertex coordinate error between a vertex of the instance and a corresponding vertex of the reconstructed instance; determining a quantization index in response to the determined quantization parameter; and encoding the quantization index and the vertex coordinate error into the bitstream as described below. The present principles also provide an apparatus for performing these steps.

The present principles provide a method for decoding a bitstream representing a 3D model, comprising the steps of: accessing a reconstructed instance corresponding to an instance; determining a quantization index from the bitstream; determining a quantization parameter in response to the quantization index; decoding a vertex coordinate error representative of an error between a vertex of the instance and a corresponding vertex of the reconstructed instance; and refining the reconstructed instance in response to the decoded vertex coordinate error as described below. The present principles also provide an apparatus for performing these steps.

The present principles also provide a computer readable storage medium having stored thereon instructions for generating or decoding a bitstream representing a 3D model according to the methods described above.

The present principles also provide a computer readable storage medium having stored thereon a bitstream representing a 3D model generated according to the methods described above.

DETAILED DESCRIPTION

As shown in FIG. 1, there may be many repetitive structures in 3D models. To efficiently encode the 3D models, the repetitive structures may be organized into patterns and instances, wherein an instance can be represented as a transformation of a corresponding pattern, for example, using a pattern ID and a transformation matrix which contains information such as translation, rotation, and scaling.

When an instance is represented by a pattern ID and a transformation matrix, the pattern ID and the transformation matrix are to be compressed when compressing the instance. Consequently, an instance may be reconstructed through the pattern ID and the decoded transformation matrix, that is, an instance may be reconstructed as transformation (from the decoded transformation matrix) of a decoded pattern indexed by the pattern ID. In one embodiment, when encoding the transformation matrix, the rotation part of the transformation matrix may be quantized, for example, using a constant number of bits. Because of loss introduced at quantization, the decoded rotation part may be different from the original rotation part.

Figure 2A:
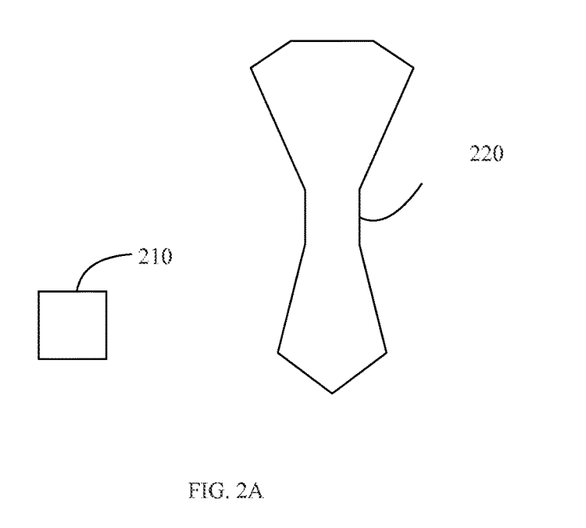
FIG. 2A shows pictorial examples depicting patterns and FIG. 2B shows pictorial examples depicting corresponding instances and reconstructed instances.
Figure 2B:
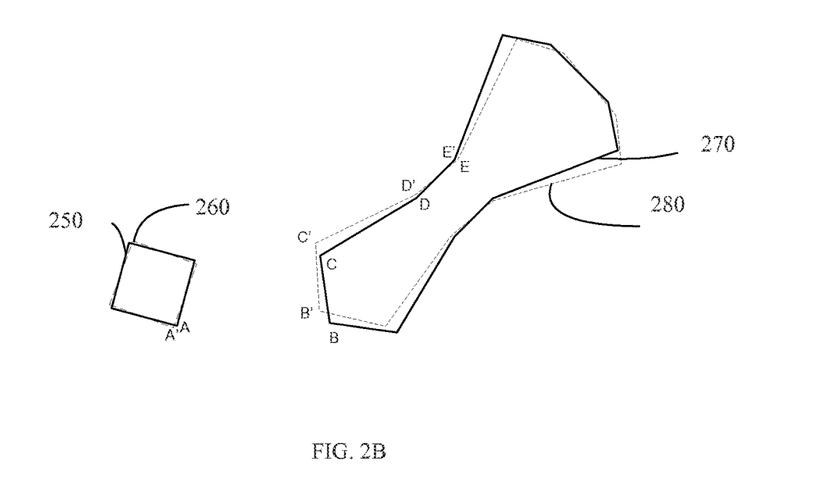

FIGS. 2A and 2B illustrate exemplary components in a 2D representation, wherein components 210 and 220 are patterns, components 250 and 270 (in solid lines) are original instances to be compressed, and components 260 and 280 (in dashed lines) are reconstructed instances. In particular, instances 250 and 270 can be represented as transformed (i.e., rotated and translated) versions of patterns 210 and 220, respectively.

In the examples of FIG. 2B, quantization of rotation introduces an error of about 5°, thus causing differences between original instances and reconstructed instances. As can be seen in FIG. 2B, while the rotation errors (in angular measure) are similar for instances 250 and 270, the vertex coordinate errors (i.e., vertex shifts, for example, from A to A', B to B' in FIG. 2B, between original instances and reconstructed instances) caused by rotation quantization vary significantly between both instances, with instance 270 having much larger vertex coordinate errors. Consequently, the quality of reconstructed components may be inconsistent, for example, a larger instance may have lower reconstruction quality than a smaller instance.

In Jiang, to efficiently compensate the vertex coordinate errors, an upper bound can be estimated for the vertex coordinate error of a vertex. Based on the upper bound, the codec decides whether the vertex coordinate error of the vertex needs to be compensated, and decides a quantization parameter for compensating the vertex coordinate error if compensation is needed. The upper bound can be estimated at both the encoder and decoder, and thus, no explicit signaling is needed to indicate whether vertex coordinate error compensation is used or to indicate the quantization parameter for the vertex coordinate error.

The present principles also provide a method and apparatus for efficiently compensating the vertex coordinate errors caused by rotation quantization. To reduce the computation load at a decoder, the quantization parameter is signaled in a bitstream. In one embodiment, an index corresponding to the number of quantization bits used for quantizing the vertex coordinate error is transmitted in the bitstream through a quantization table.

Figure 3:
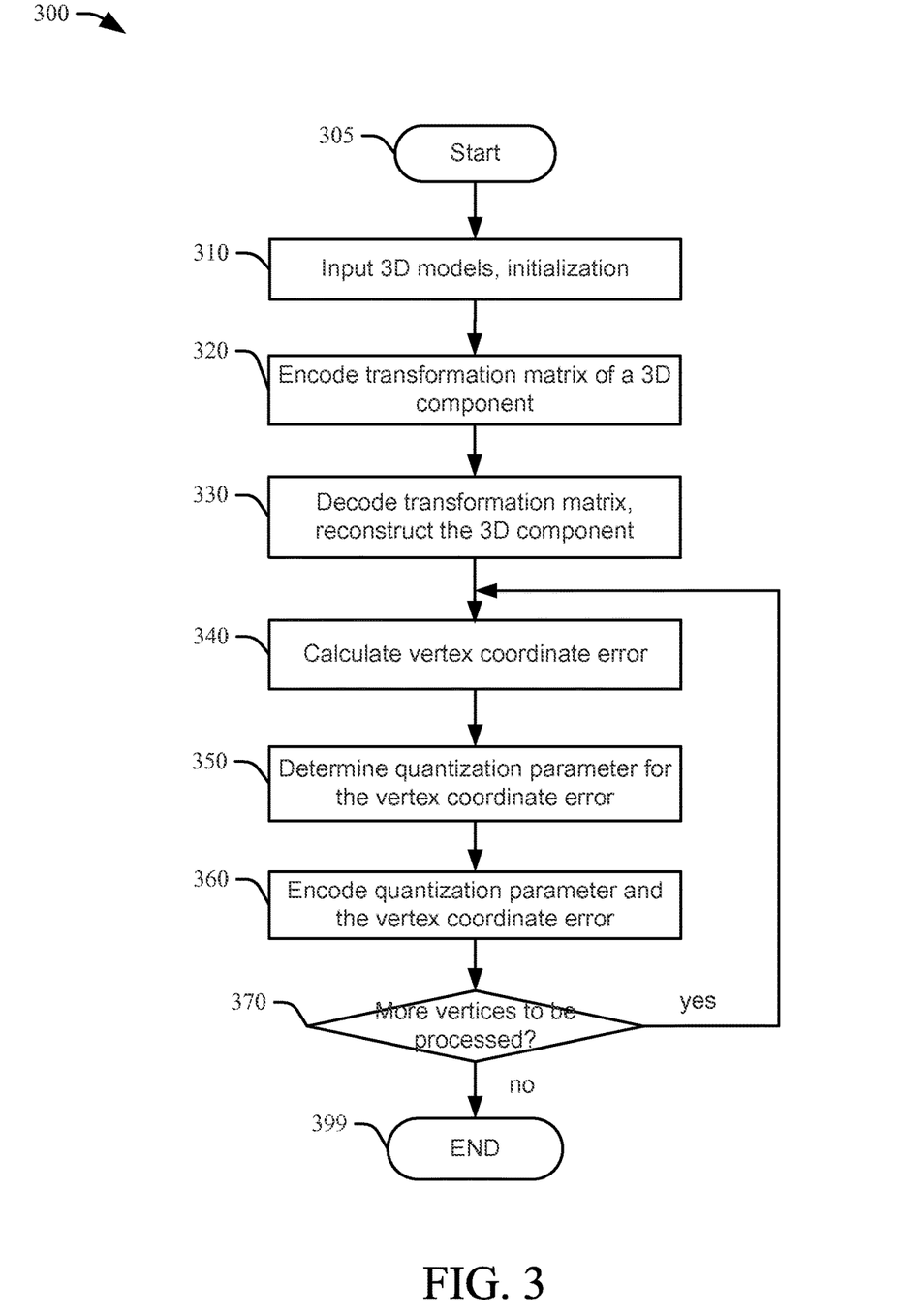
FIG. 3 is a flow diagram depicting an example for encoding an instance of a 3D model, in accordance with an embodiment of the present principles.

FIG. 3 illustrates an exemplary method 300 for encoding an instance of a 3D model. Method 300 starts at step 305. At step 310, 3D model data is input and initialization is performed. Additional data, such as a quality parameter, a maximum tolerable vertex coordinate error, quantization parameters for the translation part and rotation part of a transformation matrix, may also be input or inferred from the input. In one exemplary embodiment, the initialization step may organize the repetitive structures into patterns and instances, generate transformation matrices for instances, and encode patterns to form reconstructed patterns. For a particular to-be-encoded instance (denoted as C), the corresponding original pattern, reconstructed pattern, and transformation matrix are denoted as P, P', and T, respectively. It is possible that an instance can be precisely represented as a transformation of a pattern, that is, C=TP. Alternatively, the transformation of the pattern may be an approximate of the instance under some circumstances, that is, C≈TP.

The transformation matrix (T) is encoded at step 320. At step 330, the encoded transformation matrix is then decoded as T', and the instance is reconstructed, for example, using a corresponding reconstructed pattern and decoded transformation matrix (C'=T'P').

At step 340, the vertex coordinate error ($E_i$) between the vertex ($V_i'$) in the reconstructed instance and the corresponding vertex ($V_i$) in the original instance is calculated, for example, as $E_i=V_i-V_i'$. In order to encode the vertex coordinate error, a quantization parameter is estimated at step 350. The vertex coordinate error is quantized and coded at step 360. In addition, the quantization parameter is signaled in the bitstream. At step 370, it checks whether more vertices need to be processed. If more vertices are to be processed, the control is returned to step 340. Otherwise, the control is passed to the end step 399.

To efficiently signal the quantization parameter, an index of the quantization parameter, rather than an actual quantization parameter, can be encoded into the bitstream. Using the number of quantization bits as an exemplary quantization parameter, the quantization process is discussed in further detail. The present principles can also be applied when other quantization parameters, for example, but not limited to, quantization step size, are used.

TABLE 1

| Quantization index | Number of quantization bits |
|---|---|
| 0 | 2 |
| 1 | 4 |
| 2 | 5 |
| 3 | 6 |

TABLE 1 illustrates an exemplary quantization table, wherein the number of quantization bits is mapped to a quantization index. Specifically, QBtable[0]=2;
QBtable[1]=4;
QBtable[2]=5;
QBtable[3]=6.

We denote MaxErrorAllow as quality requirement (i.e., the maximum tolerable vertex coordinate error) provided by a user and Error as the difference between vertex coordinates of the original instance and the reconstructed instance for a particular vertex. For the particular vertex, we estimate the initial number of bits needed to quantize the vertex coordinate error as:

$$QB=\text{ceil}[\log 2(\text{Error}/\text{MaxErrorAllow})]. \quad (1)$$

Then we search the quantization table for the number of quantization bits that is closest to QB. For example, when QB=7, a quantization index 3 (QBtable[3]=6) is selected as a corresponding quantization index and QB is set to 6. Subsequently, Error/MaxErrorAllow is quantized into a binary code of QB bits. The quantization index and the binary code are then encoded into the bitstream. As can be seen from TABLE 1, the value of a quantization index is usually smaller than the corresponding number of quantization bits, and may require fewer bits to transmit. Thus, sending a quantization index rather than sending the number of quantization bits directly may reduce the bit rate.

At the decoder, the maximum tolerable error (MaxErrorAllow) and quantization table can be derived from the bitstream. For a vertex, the quantization index is received from the bitstream, and the number of quantization bits QB can be determined from the quantization index and the quantization table. The quantized vertex coordinate error Q_value can then be read as QB bits from the bitstream. The vertex coordinate error can be calculated as:

$$\text{Error}'=\text{MaxErrorAllow}*Q\_value. \quad (2)$$

For example, we assume the quantization index and the binary code representative of the quantized vertex coordinate error are encoded in the bitstream contiguously and they are '1010100111 . . . '. If the quantization index is encoded with 2 bits, we get a quantization index '10'32 2. If the quantization table as shown in TABLE 1 is used, the number of quantization bits can be derived as QBtable[2]=5. Subsequently, we read 5 bits '10100' from the bitstream and determine the quantized vertex coordinate error as Q_value='10100'=20. Thus, Error'=MaxErrorAllow*20.

As discussed above, a quantization table is used to indicate the quantization parameter in the bitstream. In one embodiment, the quantization table can be specified by metadata or user input. In another embodiment, the quantization table can be built based on statistical data.

For example, we can calculate values for QB, based on Eq. (1), using different vertices from a large amount of components from different 3D models. After we get a large set of QB values, we can choose n most frequently occurred QB values as elements of the QB table. If we denote the n most frequently occurred QB values as $QB_0, QB_1, \ldots, QB_{n-1}$, the quantization table can be illustrated as shown in TABLE 2. When fixed-length coding is used to encode the quantization index, we may build the table such that $QB_0 < QB_1 < \ldots < QB_{n-1}$. When variable-length coding is used to encode the quantization index, to reduce the amount of data used to send quantization indices, we may set up the quantization table such that $Prob(QB_0) > Prob(QB_1) > \ldots > Prob(QB_{n-1})$. That is, a more probable number of quantization bits corresponds to a smaller index, which usually requires fewer bits to encode.

TABLE 2

| Quantization index | Number of quantization bits |
| --- | --- |
| 0 | $QB_0$ |
| 1 | $QB_1$ |
| ... | ... |
| n − 1 | $QB_{n-1}$ |

Figure 4:
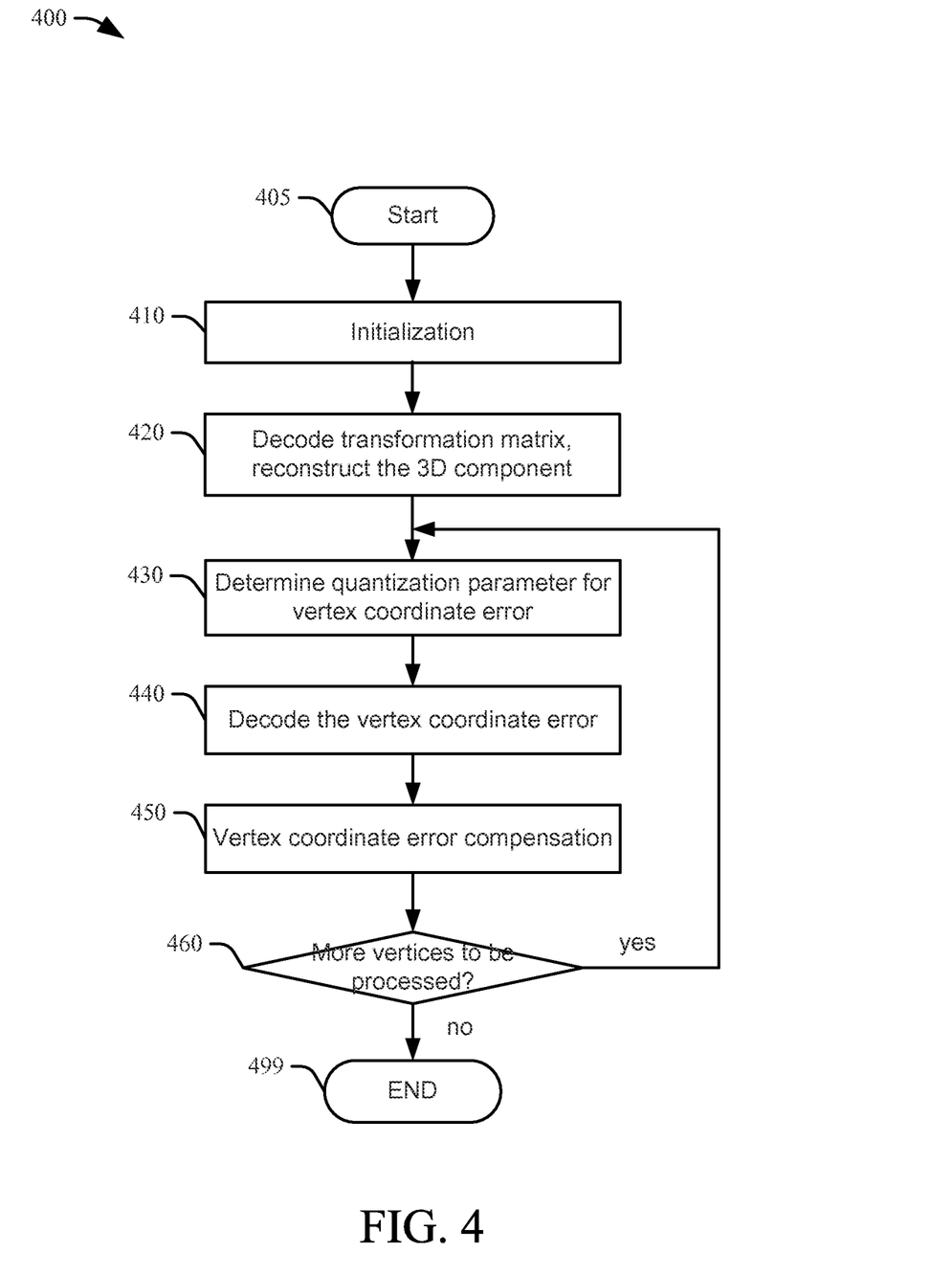
FIG. 4 is a flow diagram depicting an example for decoding an instance of a 3D model, in accordance with an embodiment of the present principles.

FIG. 4 illustrates an exemplary method 400 for decoding an instance of a 3D model. The input of method 400 may include a bitstream, for example, the bitstream generated using method 300. Additional data, for example, a reconstructed pattern (P') corresponding to the instance to be decoded may also be included as an input. Method 400 starts at step 405. At step 410, initialization is performed, for example, the quantization parameters for the transformation matrix and quality parameter are derived from the input bitstream and the maximum tolerable vertex coordinate error is calculated from the quality parameter.

The transformation matrix is decoded as T', and the instance is reconstructed as C at step 420, for example, using a corresponding reconstructed pattern and decoded transformation matrix (C'=T'P'). At step 430, a quantization parameter, for example, the number of quantization bits (QB), is determined from the bitstream. The encoded vertex coordinate error is decoded at step 440, for example, QB bits are read from the bitstream and the vertex coordinate error is calculated using Eq. (2). At step 450, the decoded vertex coordinate error ($E_i'$) is used to compensate the corresponding vertex ($V_i'$) of the instance initially reconstructed at step 420, for example, as $V_i''=V_i'+E_i'$. That is, the vertex of the reconstructed instance is refined. Method 400 ends at step 499.

A vertex coordinate error compensation flag may be used to indicate whether the vertex coordinate error is compensated. The flag should be known at both the encoder and decoder. When the flag is set to 1, the error compensation is used. Otherwise, the vertex coordinate error compensation is not used. Specifically, when methods 300 and 400 are used, steps 340-370 in method 300 and steps 430-460 are not needed if the flag is 0.

In one exemplary embodiment, the decoding process of a bitstream representing a 3D model can be described using the following pseudo-code.

```
void PB3DMC_Decoder( )
{
Read PB3DMC_stream_header;
if (uni_part_bit == 0 && repeat_struc_bit == 0)
{
Decode the 3D model using the decoder indicated by 3d_model_compr_mode;
}
else
{
if (uni_part_bit == 1)
{
Decode the unique part using the decoder indicated by 3d_model_compr_mode;
Separate different unique components by traversal based on connectivity;
Decode the translation vectors of unique components;
Reconstruct the unique part by translating all reconstructed unique components to their
positions;
}
if (repeat_struc_bit == 1)
    {
    Repeat_Struc_Decoder( );
    }
}
}
void Repeat_Struc_Decoder ( )
{
Decode all patterns;
if (sym_instance_num > 0)
{
Decode all symmetric instances;
Decode all stitching information;
}
Reconstruct all unconnected-repetitive-structure patterns and unique components which
include symmetric structures, using the recovered patterns, symmetric instances and
stitching information;
Decode the translation vectors of all unconnected-repetitive-structure patterns and unique
components which include symmetric structures;
Reconstruct those components corresponding to all unconnected-repetitive-structure
patterns and unique components which include symmetric structures using the decoded
translation vectors;
```

```
if (insta_trans_elem_bit == 1)
{
Instance_Elementary_Mode_Decoder( );
}
else
{
Instance_Grouped_Mode_Decoder( );
}
}
void Instance_Elementary_Mode_Decoder( )
{
for (i = 0; i < numInstance; i ++)
{
Read elem_insta_QP_translation_flag;
Read elem_insta_QP_rotation_flag;
if(elem_insta_QP_translation_flag == 1)
{
Decode elem_QP_translation;
}
        else
{
elem_QP_translation = QP_Translation;
}
if(elem_insta_QP_ rotation_flag == 1)
{
Decode elem_QP_ rotation;
}
        else
{
elem_QP_rotation = QP_rotation;
}
Decode idPattern;
Read elem_insta_flip_flag;
Read elem_insta_reflection_flag;
Read elem_insta_attribute_header;
Decode instance translation vector by fixed length decoder whose parameter is
QB_translation;
Decode Euler angles by fixed length decoder whose parameter is QB_rotation;
Recover rotation matrix using the decoded Euler angles;
if (using_scaling_bit == 1)
        Decode scaling factor;
if (error_compen_enable_bit == 1)
{
Read elem_insta_error_compen_flag;
if (elem_insta_error_compen_flag == 1)
Decode error compensation data;
}
Recover the geometry of current instance by the pattern indicated by idPattern, recovered
translation vector, recovered rotation matrix, reflection transformation if there is any,
scaling factor if there is any, error compensation data if there is any;
if(elem_insta_flip_flag == 1)
Flip all triangles of current instance;
Decode the attribute data of current instance;
}
}
void Instance_Grouped_Mode_Decoder( )
{
Read the elem_insta_QB_translation_flag of all instances;
Read the elem_insta_QB_rotation_flag of all instances;
Decode the elem_insta_QB_translation of those instances whose
elem_insta_QB_translation_flag is 1;
Decode the elem_insta_QB_rotation of those instances whose elem_insta_QB_rotation
_flag is 1;
Read compr_insta_patternID_header;
Decode pattern IDs of all instances;
Read the elem_insta_flip_flag of all instances;
Read the elem_insta_reflection_flag of all instances;
Read compr_insta_transl_header;
    Decode translation vectors of all instances by octree decomposition based decoder;
Read compr_insta_rotat_header;
Decode the Euler angles of all instances;
Recover the rotation matrices of all instances;
```

```
if (use_scaling_bit == 1)
{
Read compr_insta_scaling_header;
Decode the scaling factors of all instances;
}
if (error_compen_enable_bit == 1)
{
Read elem_insta_error_compen_flag of all instances;
for (i = 0; i < numInstance; i ++)
{
if (the corresponding elem_insta_error_compen_flag is 1)
Decode the error compensation data for the current instances;
}
}
Recover the geometry of all instances by the recovered patterns, recovered translation
vectors, recovered rotation matrices, reflection transformations if there are any, scaling
factors if there are any, error compensation data if there is any;
Decode the attribute data of all instances if there is any;
}
```

In TABLE 3, exemplary syntax and semantics are illustrated for the quantization table, which may be included in a bitstream header.

TABLE 3

```
if (error_compen_enable_bit=='1'){
    error_compen_QB_table[0..3]
}
``` error_compen_enable_bit: This 1-bit unsigned integer indicates whether or not there are data fields of compressed coding error compensation data for some instances in the bitstream. 0 means there is no data field of compressed coding error compensation data of instances in the bitstream and 1 means there are data fields of compressed coding error compensation data of some instances in the bitstream. This bit corresponds to the vertex coordinate error compensation flag discussed before for methods 300 and 400.

error_compen_QB_table: If the error compensation mode is activated, the number of quantization bits of the compensated value for each vertex may be adaptively determined at the encoder. The encoder transmits an index of the number of quantization bits instead of the number of quantization bits itself into the bitstream. The decoder looks up the quantization table to determine the number of the quantization bits. There are 4 pre-defined quantization bits in the table, each represented by one 5-bit unsigned integer.

In TABLE 4, exemplary syntax and semantics for vertex error compensation data are illustrated. In this example, class compr_elem_insta_error_compen_data contains the compressed vertex error compensation data of the $i^{th}$ instance.

TABLE 4

```
classcompr_elem_insta_error_compen_data{
    for (j = 0; j < numofvertex; j ++) {
        elem_compen_err_QB_id
        compr_ver_compen_err_data
    }
}
``` elem_compen_err_QB_id: This 2-bit unsigned integer indicates the index of the number of quantization bits for the $j^{th}$ vertex of the instance in error_compen_QB_table.
compr_ver_compen_err_data: This data field contains the compressed compensated value of the $j^{th}$ vertex of the instance.

Figure 5:
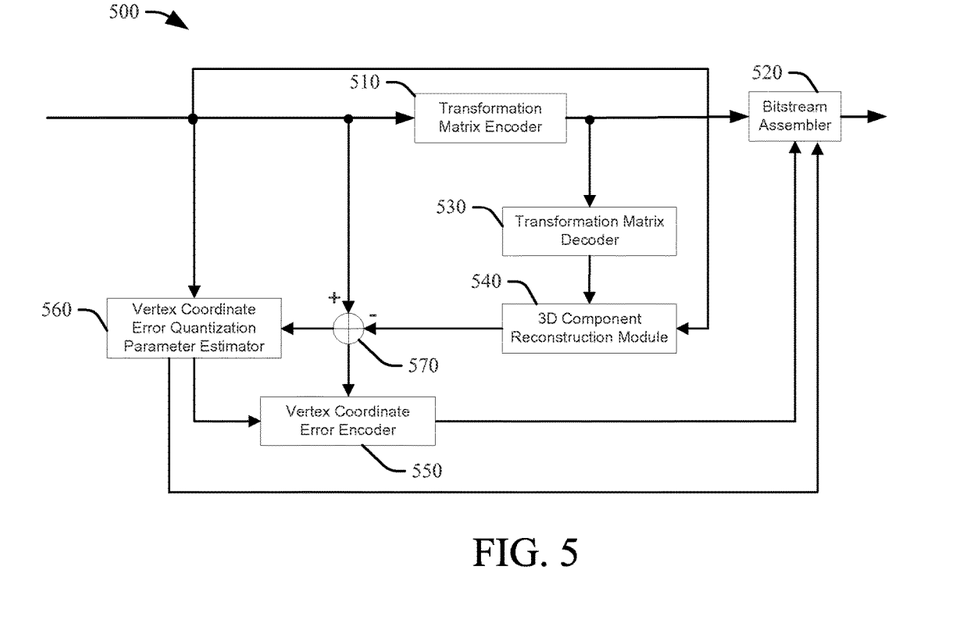
FIG. 5 shows an exemplary instance encoder according to the present principles.

FIG. 5 depicts a block diagram of an exemplary instance encoder 500. The input of apparatus 500 may include an instance (C) to be encoded, a corresponding pattern (P) and reconstructed pattern (P'), transformation matrix T, a quality parameter, and quantization parameters for transformation matrix.

Transformation matrix encoder 510 encodes the transformation matrix T, for example, based on the quantization parameters for different parts of the transformation matrix. Transformation matrix decoder 530 decodes the output of encoder 510 to get a reconstructed transformation matrix T'. Using a corresponding reconstructed pattern P' and T', the instance may be reconstructed as C'=T'P' at 3D component reconstruction module 540. Adder 570 takes differences between the original instance and the reconstructed instance, for example, as E=C−C.

Based on the vertex coordinate error E, vertex coordinate error quantization parameter estimator 560 estimates a quantization parameter for quantizing the vertex coordinate error at vertex coordinate error encoder 550, for example, using Eq. (1). Quantization parameter estimator 560 may further obtain a corresponding index for the estimated quantization parameter from a quantization table, and the quantization parameter may be adjusted based on the quantization index. The outputs of transformation matrix encoder 510 and vertex coordinate error encoder 550, and the quantization index are assembled by bitstream assembler 520 into a bitstream, which can be combined with other bitstreams representing the pattern or other components to form an overall bitstream for a 3D model.

Figure 6:
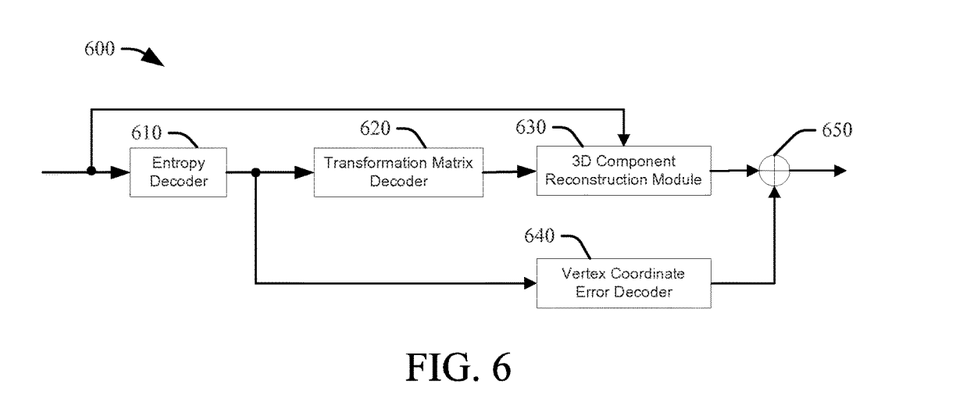
FIG. 6 shows an exemplary instance decoder according to the present principles.

FIG. 6 depicts a block diagram of an exemplary instance decoder 600. The input of apparatus 600 may include a bitstream corresponding to an instance (C), for example, a bitstream generated according to method 300 or by encoder 500, and a corresponding reconstructed pattern (P'). Entropy decoder 610 decodes the bitstream, for example, to get quantized vertex coordinate errors, quantization parameters used for transformation matrix, and the quantization table and quantization indices used for vertex coordinate error compensation.

Transformation matrix decoder 620 reconstructs transformation matrix T', for example, based on the quantization parameters for different parts of the transformation matrix. Using a corresponding reconstructed pattern P' and T', the instance may be reconstructed as C'=T'P' at 3D component reconstruction module 630.

Vertex coordinate error decoder 640 derives the quantization parameter, for example, based on the quantization index and quantization table. It then may decode the vertex coordinate error. The decoded vertex coordinate errors E' are used to refine the instance initially reconstructed at 3D component reconstruction module 630. In particular, adder 650 sums up the decoded coordinate errors (E') and the initial reconstructed instance (C), for example, as C"=C'+E'. C" usually provides a more accurate representation of the original instance than the initial reconstructed instance C'.

Several of the implementations and features described in this application may be used in the context of the MPEG 3DGC Standard and its extensions.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for generating a bitstream representing a 3D model, comprising:
   accessing a reconstructed instance corresponding to an instance;
   determining a quantization parameter based on a vertex coordinate error between a vertex of the instance and a corresponding vertex of the reconstructed instance;
   determining a quantization index in response to the determined quantization parameter; and
   encoding the quantization index and the vertex coordinate error into the bitstream.

2. The method of claim 1, wherein the determining a quantization index is based on a syntax that indicates a mapping between a plurality of quantization indices and a plurality of respective quantization parameters.

3. The method of claim 2, further comprising:
   determining the mapping between the plurality of quantization indices and the plurality of respective quantization parameters based on statistical data.

4. The method of claim 3, wherein a smaller quantization index corresponds to a more frequent quantization parameter in the statistical data.

5. The method of claim 1, wherein the quantization parameter is determined further in response to a maximum tolerable error.

6. The method of claim 1, wherein the quantization parameter corresponds to at least one of the number of quantization bits and a quantization step size.

7. A method for decoding a bitstream representing a 3D model, comprising:
   accessing a reconstructed instance corresponding to an instance;
   determining a quantization index from the bitstream;
   determining a quantization parameter in response to the quantization index;
   decoding a vertex coordinate error representative of an error between a vertex of the instance and a corresponding vertex of the reconstructed instance, based on the determined quantization parameter; and
   refining the reconstructed instance in response to the decoded vertex coordinate error.

8. The method of claim 7, wherein the determining a quantization parameter is based on a syntax that indicates a mapping between a plurality of quantization indices and a plurality of respective quantization parameters.

9. The method of claim 7, wherein the vertex coordinate error is decoded further responsive to a maximum tolerable error.

10. The method of claim 7, wherein the quantization parameter corresponds to at least one of the number of quantization bits and a quantization step size.

11. An apparatus for generating a bitstream representing a 3D model, comprising at least one memory and one or more processors, the one or more processors configured to:
   access a reconstructed instance corresponding to an instance;
   determine a quantization parameter based on a vertex coordinate error between a vertex of the instance and a corresponding vertex of the reconstructed instance;
   determine a quantization index in response to the determined quantization parameter; and
   encode the quantization index and the vertex coordinate error into the bitstream.

12. The apparatus of claim 11, wherein the one or more processors are configured to determine a quantization index based on a syntax that indicates a mapping between a plurality of quantization indices and a plurality of respective quantization parameters.

13. The apparatus of claim 12, wherein the one or more processors are configured to determine the mapping between the plurality of quantization indices and the plurality of respective quantization parameters based on statistical data.

14. The apparatus of claim 13, wherein a smaller quantization index corresponds to a more frequent quantization parameter in the statistical data.

15. The apparatus of claim 11, wherein the quantization parameter is determined further in response to a maximum tolerable error.

16. The apparatus of claim 11, wherein the quantization parameter corresponds to at least one of the number of quantization bits and a quantization step size.

17. An apparatus for decoding a bitstream representing a 3D model, comprising at least a memory and one or more processors, the one or more processors configured to:
   access a reconstructed instance corresponding to an instance;
   determine a quantization index from the bitstream;
   determine a quantization parameter corresponding to the quantization index;
   decode a vertex coordinate error representative of an error between a vertex of the instance and a corresponding vertex of the reconstructed instance, based on the determined quantization parameter; and
   refine the reconstructed instance in response to the decoded vertex coordinate error.

18. The apparatus of claim 17, wherein the one or more processors are configured to determine a quantization parameter based on a syntax that indicates a mapping between a plurality of quantization indices and a plurality of respective quantization parameters.

19. The apparatus of claim 17, wherein the one or more processors are configured to decode the vertex coordinate error further responsive to a maximum tolerable error.

20. The apparatus of claim 17, wherein the quantization parameter corresponds to at least one of the number of quantization bits and a quantization step size.

* * * * *

UNITED STATES PATENT AND TRADEMARK OFFICE
CERTIFICATE OF CORRECTION

PATENT NO. : 9,866,840 B2  
APPLICATION NO. : 14/655358  
DATED : January 9, 2018  
INVENTOR(S) : Wenfei Jiang, Kangying Cai and Jiang Tian Page 1 of 1

It is certified that error appears in the above-identified patent and that said Letters Patent is hereby corrected as shown below:

On the Title Page

Column 1 (item (71), Applicant), Line 4 and Line 5, Delete the text "Issy de Moulineaux (FR)" and insert the text --Issy-les-Moulineaux (FR)--.

Column 2 (item (57), Abstract), Line 11, Delete the text "the" and insert the text --that--.

In the Specification

Column 1, Line 6, Delete the text "PCT/US2013/077404" and insert the text --PCT/CN2013/077404--.

Signed and Sealed this  
Fourth Day of October, 2022

Katherine Kelly Vidal  
*Director of the United States Patent and Trademark Office*